Aug. 27, 1974   H. V. HESS ET AL   3,832,279
INTEGRATED KRAFT PULPING PROCESS INCLUDING HYDROGEN SULFIDE
PRETREATMENT OF WOOD CHIPS AND SULFUR DIOXIDE
TREATMENT OF BLACK LIQUOR TO LOWER pH
THEREOF PRIOR TO COKING
Filed Aug. 7, 1972                              2 Sheets-Sheet 1

FIG. 1

3,832,279
INTEGRATED KRAFT PULPING PROCESS, IN-
CLUDING HYDROGEN SULFIDE PRETREAT-
MENT OF WOOD CHIPS AND SULFUR DI-
OXIDE TREATMENT OF BLACK LIQUOR TO
LOWER pH THEREOF PRIOR TO COKING
Howard V. Hess, Glenham, Edward L. Cole, Fishkill, and William F. Franz, Gardiner, N.Y., assignors to Texaco Inc., New York, N.Y.
Filed Aug. 7, 1972, Ser. No. 278,681
Int. Cl. D21c 3/00
U.S. Cl. 162—82
9 Claims

ABSTRACT OF THE DISCLOSURE

Disclosed is an improved and integrated Kraft pulping process wherein the wood chips are pretreated in an alkaline "buffer" medium containing $H_2S$ at a partial pressure of about 90 to 110 p.s.i.g. at about 260° F. The hydrogen sulfide is produced by coking in the liquid phase a spent Kraft pulping liquor that has been made acid with absorbed $SO_2$. This $SO_2$ is generated by burning sulfur-containing coke resulting from coking the acid spent Kraft liquor.

BACKGROUND OF THE INVENTION

Field Of The Invention

Figure 2:
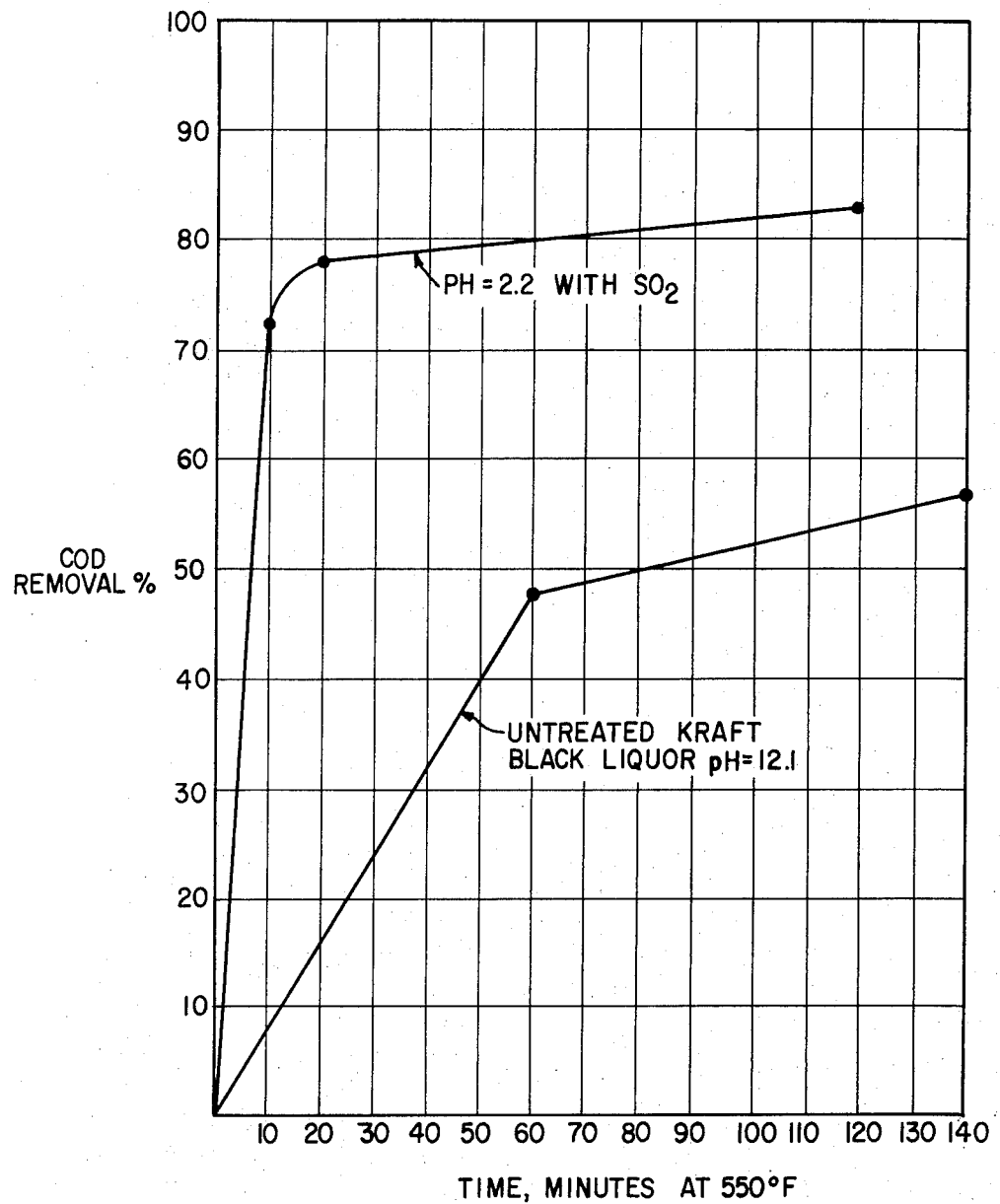

This invention relates to a novel, essentially pollution-free, Kraft wood pulping process which leads to the production of increased amounts of wood pulp without increasing production costs.

SUMMARY OF THE INVENTION

In accordance with this invention, wood chips are pretreated in an alkaline medium at 90 to 110 p.s.i.g. $H_2S$ partial pressure at about 260° F. before being digested in Kraft cooking liquor. The alkaline medium is a dilute solution of e.g. $Na_2CO_3$, $CaCO_3$, $Ca(OH)_2$, Kraft or soda green liquor, etc.

What makes the novel process economically viable and essentially pollution-free is that the spent cooking liquor is coked under acid conditions to produce the required hydrogen sulfide, the formation and processing of which substantially eliminates the discharge of air and water pollutants from installations in which the process is carried out.

In the drawing, FIG. 1 shows one installation in which the process of the invention can be carried out. FIG. 2 is a graph showing comparison of the amount of COD reduction at various pH's.

As shown in FIG. 1, aqueous alkaline solution in line 1 is treated with an $H_2S$-bearing gas in absorber 2. This $H_2S$-bearing gas is produced by coking the spent Kraft liquor in the liquid phase and appears in line 22 of the flow diagram. The aqueous alkaline "buffer" solution is described in Canadian Pat. 814,882 and comprises make-up alkaline "buffer" solution introduced at point 1, recycle pretreat liquor flowing through 1a and $H_2S$ flowing through line 22 from coking spent Kraft liquor that has been made acid with adsorbed $SO_2$. The three components are charged to vessel 2 in such a ratio that in pretreating zone 4 the liquor to wood ratios will be between about 3.0/1 and 5.0/1; the alkali, expressed as $Na_2O$, will be about 1 to 4 grams per liter of treating solution and the concentration of $H_2S$ being such that at 260° F. (the treating temperature), the partial pressure will be approximately 95 to 105 p.s.i.g. Following pretreatment of the raw chips at about 260° F. the pretreating liquor is separated from the chips in separator 4 and recycled to vessel 2. The treated wood chips are passed via line 5a to a conventional Kraft Digester 6 from which wood pulp, chemical vapor, and spent Kraft liquor are recovered. The spent Kraft liquor next passes through line 7 to absorber 8 where it is treated with $SO_2$-containing flue gas to reduce its pH to between about 2 and 6. The liquor then is pumped up to a pressure of between 300 and 3500 p.s.i.g. by pump 9 and passes through heater 10 where the liquid phase coking reaction occurs at between 400 and 650° F. and then to separator 11 where coke settles to the bottom. A gas phase is produced and passes through a pressure regulator to line 22 and a liquid phase is separated. While still hot and under pressure, this liquid passes to flash drum 12 wherein the pressure is reduced and part of the liquid and gas are flashed off. The flashed liquid is condensed in condenser 13 and the flashed gas passes to line 22. The condensed flashed liquid (now sodium free) is used to wash the coke in vessel 16.

An important part of the process is the treatment of the coke in separator 11. Here coke is drawn off through a liquid-solid cyclone 15 where the bulk of the occluded liquid is removed as overflow and the coke then passes to coke washer 16. Next, the liquid is passed countercurrently to the wash liquid coming in through line 14. The washed coke then passes through cyclone 17 to coke drier 30. The overflow from cyclone 17 along with the liquid from coke washer 16 and cyclone 15 are combined with the liquid from flash drum 12 in line 18. The liquid in line 18 which is an aqueous solution comprising sodium ion, carbonate ion and various sulfur containing ions, is made alkaline with lime in 19. After suitable chemical adjustment, the liquid in line 21 becomes a suitable pulping liquid for Kraft pulping in digester 6. This feature also aids in reducing the costs of the process.

The washed coke passing from cyclone 17 to coke drier 30 is dried with $SO_2$-containing flue gas produced in heater 10 which enters the drier through line 31. In the drier, residual water is removed from the coke and the flue gas is cooled. Next, the dry coke is passed through line 32 to the fired heater 10 where it is burned to supply all or a portion of the heat for the coking reaction. Optionally, process steam also can be produced by adding a second coil, not shown, in heater 10, thereby also contributing to lowering the costs of the process.

Cooled flue gas leaves the top of coke drier 30 through line 33 and a sufficient quantity thereof is passed through line 34 to absorber 8 to adjust the pH of the spent Kraft Liquor. The gas removed from the top of absorber 8 (now free from $SO_2$), is passed to the stack through line 50 Part of the flue gas in line 33 can be passed to the sulfur recovery unit shown as 35 where the $SO_2$ may be reacted with $H_2S$ (Claus Process) to produce elemental sulfur and water containing entrained sulfurous gases. Gas emanating from the sulfur recovery unit can be routed through line 36 to heater 10 where any $H_2S$ present is converted to $SO_2$.

In FIG. 1, the gas produced in the Kraft digester 6 has been shown to pass to chemicals recovery zone 40 to recover dimethyl sulfide or methyl mercaptan, chemicals of commerce, or alternately is burned in heater 10. Gases coming from the chemicals recovery section 40 are routed to heater 10 for elimination of $H_2S$.

Any excess $H_2S$ from absorber 2 or line 22 can be reacted in the sulfur recovery unit to form elemental sulfur by the Claus Reaction:

$$2H_2S + SO_2 \rightarrow 3S + 2H_2O$$
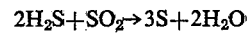

The importance of carrying out the coking operation at a low pH can be appreciated by examining the curves of FIG. 2 which show the change in coking effectiveness and coking rate, as measured by chemical Oxygen Demand removal, when the pH of the spent Kraft liquor charged to the coker is reduced with $SO_2$. The spent black Kraft liquor was coked at 550° F. under about 1100 p.s.i.g. for 2 hours at a pH of 12.1 and 2.2. Chemical Oxygen Demand removals of over 80% were obtained with the low pH cokings as opposed to 56% in the high pH coking run. It was also noted, and this is also economically significant, that the coking rate, as measured by COD removal, was greatly accelerated by coking lower pH liquors. Furthermore the $H_2S$ production was greatly increased by coking at the reduced pH achieved by $SO_2$ adsorption. This is demonstrated in the following tabulation.

| pH | Wt. percent of gas basis black liquor | Mole percent $H^2S$ in gas |
|---|---|---|
| 12.1 | 0.53 | 1.45 |
| 4.8 | 2.81 | 32.5 |
| 2.2 | 4.2 | 38.3 |

To prevent formation of coke gels, it is advisable to effect the coking operation at a rapid rate of about 110° F. to about 150° F. per minute in the temperature interval of 350° F. to 550° F.

There are obviously many variations of the subject process that may be made without departing from the spirit of the invention. For example, in coke burner 10 both $CO_2$ and $SO_2$ are produced. Elimination of $CO_2$ from the $SO_2$ steam in 34 is economically feasible.

What is claimed is:

1. A Kraft pulping process comprising pretreating wood chips with an alkaline buffer medium containing hydrogen sulfide under a hydrogen sulfide partial pressure of about 90 to 110 p.s.i.g.; digesting said chips in cooking liquor; removing the resulting wood pulp from said cooking liquid; contacting the now spent liquor with $SO_2$-containing flue gases to reduce the pH thereof to below 7 by absorption of $SO_2$; coking said spent liquor at a temperature of between about 400 to 650° F. in the liquid phase under pressure of between 300 and 3500 p.s.i.g. to form hydrogen sulfide-containing gas, a liquid coker effluent and sulfur-bearing coke, separating said coke from said liquid coker effluent and said gas, burning at least a portion of said coke thereby forming $SO_2$-containing flue gas, and flowing the aforementioned hydrogen sulfide-containing gas to said alkaline medium.

2. Process according to Claim 1, wherein a part of said sulfur dioxide-containing gases are reacted with hydrogen sulfide to produce sulfur and water containing sulfurous gases.

3. Process according to Claim 1, wherein gases resulting from digestion of said wood chips are flowed to a chemical recovery zone.

4. The process of Claim 1, wherein prior to coking same said spent cooking liquor is contacted with an amount of $SO_2$-containing flue gas sufficient to bring the pH thereof to between 2 and 5.

5. The process according to Claim 1, wherein said coking is carried out at a temperature of between 400 and 650° F. under a pressure of between 300 and 3500 p.s.i.g. for between 10 minutes and 2 hours.

6. The process according to Claim 5, wherein said coking is carried out at the rate of about 110° F. to about 150° F. per minute in the temperature range of about 350° to 550° F. to prevent formation of coke gels.

7. The process according to Claim 1, further including the steps of: dewatering said coke; washing said coke with a part of said effluent; combining said part with the rest of said effluent to form an aqueous solution containing pulping chemicals; contacting said aqueous solution with lime and make-up chemicals to form fresh cooking liquor.

8. The process according to Claim 7, further including the steps of: drying said coke with said $SO_2$-containing flue gas thereby cooling said gas and contacting said spent liquor with a part of said $SO_2$-containing flue gas to lower the pH thereof.

9. The process according to Claim 8, further including the steps of: reacting the rest of said $SO_2$-containing flue gas with excess hydrogen sulfide to produce elemental sulfur and sulfur-containing gases.

References Cited

UNITED STATES PATENTS

| | | | |
|---|---|---|---|
| 3,607,619 | 9/1971 | Hess et al. | 162—30 |
| 3,560,329 | 2/1971 | Nelson et al. | 162—30 |
| 3,558,426 | 1/1971 | Hess et al. | 162—30 |
| 3,649,534 | 3/1972 | Schotte | 210—63 |
| 3,595,806 | 7/1971 | Prahacs et al. | 162—30 X |
| 3,717,545 | 2/1973 | Hess et al. | 162—31 |

S. LEON BASHORE, Primary Examiner

A. D'ANDREA JR., Assistant Examiner

U.S. Cl. X.R.

162—31